(12) United States Patent
Osada et al.

(10) Patent No.: US 8,483,862 B2
(45) Date of Patent: Jul. 9, 2013

(54) WORKING SYSTEM AND WORK-AUTOMATING METHOD

(75) Inventors: Atsushi Osada, Tochigi (JP); Masaru Maruo, Tochigi (JP); Katsuyoshi Tsutsumida, Tochigi (JP); Mitsugu Takahashi, Tochigi (JP); Takao Shibayama, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 264 days.

(21) Appl. No.: 12/921,944

(22) PCT Filed: Feb. 16, 2009

(86) PCT No.: PCT/JP2009/052516
§ 371 (c)(1),
(2), (4) Date: Sep. 10, 2010

(87) PCT Pub. No.: WO2009/113359
PCT Pub. Date: Sep. 17, 2009

(65) Prior Publication Data
US 2011/0004340 A1     Jan. 6, 2011

(30) Foreign Application Priority Data

Mar. 12, 2008   (JP) .................. 2008-062647
Mar. 17, 2008   (JP) .................. 2008-068525

(51) Int. Cl.
*G06F 19/00*       (2011.01)
(52) U.S. Cl.
USPC ........................... 700/112; 702/183; 271/265

(58) Field of Classification Search
USPC ............ 700/95, 111–114, 245, 248; 702/183; 271/265
See application file for complete search history.

(56) References Cited

U.S. PATENT DOCUMENTS

| | | | | |
|---|---|---|---|---|
| 6,108,662 | A  * | 8/2000 | Hoskins et al. ................. | 700/95 |
| 2003/0208302 | A1* | 11/2003 | Lemelson et al. ............ | 700/245 |
| 2004/0073404 | A1* | 4/2004 | Brooks et al. ................. | 702/183 |
| 2004/0230336 | A1* | 11/2004 | Matsumoto et al. .......... | 700/223 |
| 2005/0102052 | A1* | 5/2005 | Yoshida et al. ............... | 700/117 |
| 2005/0102061 | A1* | 5/2005 | Lent .............................. | 700/245 |
| 2005/0240307 | A1* | 10/2005 | Kuroki et al. ................. | 700/245 |
| 2006/0136085 | A1* | 6/2006 | Steinhilper et al. ........... | 700/111 |
| 2006/0181010 | A1* | 8/2006 | Okamoto et al. ............. | 271/256 |
| 2006/0200261 | A1* | 9/2006 | Monette et al. ............... | 700/108 |

FOREIGN PATENT DOCUMENTS

| | | |
|---|---|---|
| JP | 61-021869 | 1/1986 |
| JP | 61-021872 | 1/1986 |
| JP | 61-151704 A | 7/1986 |
| JP | 63-258312 A | 10/1988 |
| JP | 06-155198 A | 6/1994 |
| JP | 6-75810 B2 | 9/1994 |
| JP | 6-83938 B2 | 10/1994 |
| JP | 8-71892 A | 3/1996 |
| JP | 2001-121385 A | 5/2001 |

\* cited by examiner

*Primary Examiner* — Mohammad Ali
*Assistant Examiner* — Anthony Whittington
(74) *Attorney, Agent, or Firm* — Arent Fox LLP (57) ABSTRACT

Provided is a work assembling system (1) comprising a manpower working area (30A) for transferring bodies (10) continuously, a robot working area (40) disposed on the downstream of the manpower working area (30A) for tact-transferring the bodies (10), and a first buffer space (50A) disposed at a boundary portion between the manpower working area (30A) and the robot working area (40).

2 Claims, 6 Drawing Sheets

WORKING SYSTEM AND WORK-AUTOMATING METHOD

TECHNICAL FIELD

The present invention relates to a working system and a work-automating method. Specifically, it relates to a working system including a manpower working area, a robot working area, and a buffer space. In addition, it relates to a work-automating method of transferring a manpower operation to a robot operation for a working system that performs manpower operations and robot operations on a work.

BACKGROUND ART

Conventionally, the body of an automobile has been assembled by manpower and robots. Therefore, an area in which operators work and an area in which robots work are mixed in a production line of the body (refer to Patent Document 1).

Herein, in a case of an operator working on a work, it is not necessary to temporarily interrupt conveyance of the work; however, in a case of a robot working on a work, it is necessary to temporarily interrupt conveyance of the work. Therefore, the manpower working area is configured such that works are continuously transferred, and the robot working area is configured such that works are tact-transferred (refer to Patent Document 2).

In addition, as described above, since the conveyance methods differ between the manpower working area and the robot working area, a buffer space is provided at a boundary portion of these working areas.

Patent Document 1: Japanese Examined Patent Application, Publication No. H6-75810
Patent Document 2: Japanese Examined Patent Application, Publication No. H6-83938

DISCLOSURE OF THE INVENTION

Problems to be Solved by the Invention

However, in a case of a fault arising in a robot, conveyance of a work in the robot working area must be temporarily interrupted. When such an interruption occurs, there is a problem in that the continuous transfer in the manpower working area on an upstream side of the robot working area is suspended, causing operators to have downtime. On the other hand, since the continuously-transferred work in the manpower working area on a downstream side of the robot working area is not supplied, there is a problem in that operators have downtime.

In addition, it has been recently demanded due to developments in robot technology that operations by manpower are gradually transferred to operations by robots such that the efficiency of assembly is improved.

The present invention has an object of providing a working system that can prevent operators of a manpower working area from having downtime even if a fault arises in a robot.

In addition, the present invention has an object of providing a work-automating method that enables smooth transition of operations by manpower to operations by robots.

Means for Solving the Problems

A working system of the present invention (e.g., a work assembling system 1 described later) includes a manpower working area (e.g., a manpower working area 30A described later) that is provided along a conveyance path (e.g., a conveyance path 21 described later) and in which a plurality of operators (e.g., operators P1 to P5 described later) is deployed, a robot working area (e.g., a robot working area 40 described later) that is provided along the conveyance path on a downstream side of the manpower working area and in which a plurality of robots (e.g., robots R1 to R6 described later) is disposed, and a buffer space (e.g., a first buffer space 50A described later) that is provided at a boundary portion between the manpower working area and the robot working area, the manpower working area being configured for continuous transfer of a work (e.g., a body 10 described later), and the robot working area being configured for tact-transfer of the work, in which a length $l_1$ of the buffer space is determined by the following formula (1):

$$l_1 = l_T + t \cdot v \quad (1)$$

In formula (1), $l_T$ is a length of one tact segment in tact-transfer, t is a time during which the conveyance of the work by way of tact-transfer is interrupted for a case where a fault occurs in a robot, and v is a conveyance speed of the work.

According to this invention, the length of the buffer space is set as in the aforementioned formula (1). Therefore, even if a fault in a robot of the robot working area occurs and the conveyance of the works by tact-transfer is temporarily interrupted, the operators in the manpower working area can be prevented from having downtime. The reason for this is that the works being conveyed by continuous transfer during a time period until the conveyance of the works is restarted can be accommodated in the buffer space on an upstream side of this robot working area.

A working system of the present invention includes a manpower working area (e.g., a manpower working area 30B described later) that is provided along a conveyance path and in which a plurality of operators is deployed, a robot working area that is provided along the conveyance path on an upstream side of the manpower working area and in which a plurality of robots is disposed, and a buffer space (e.g., a second buffer space 50B described later) provided at a boundary portion between the robot working area and the manpower working area, the manpower working area being configured for continuous transfer of a work, and the robot working area being configured for tact-transfer of the work, in which a length $l_2$ of the buffer space is determined by the following formula (2):

$$l_2 = l_T + (t + t_f) \cdot v \quad (2)$$

In formula (2), $l_T$ is a length of one tact segment in tact-transfer, t is a time during which the conveyance of the work by way of tact-transfer is interrupted for a case where a fault occurs in a robot, $t_f$ is a time after the conveyance of the work is restarted until the work for which the conveyance has been interrupted undergoes accelerated-transfer to be spilled out into the buffer space, and v is a conveyance speed of the work.

According to this invention, the length of the buffer space is set as in the aforementioned formula (2). Therefore, even if a fault in a robot of the robot working area occurs and conveyance of the works by tact-transfer is temporarily interrupted, a leading work among the works in this robot working area is spilled out into the buffer space after the conveyance of the works has restarted. This work spilled out is conveyed at high speed, and thus can be made to catch up with the work in front being continuously transferred within the buffer space. Therefore, it is possible to supply the works being continuously transferred to the manpower working area without interruption, preventing operators in the manpower working area from having downtime.

According to a work-automating method of the present invention for transferring a manpower operation to a robot operation for a working system (e.g., a work assembling system 101 described later) that employs a plurality of operators (e.g., operators P101 to P108 described later) and a plurality of robots (e.g., robots R101 to R104 described later) to perform operations on a work (e.g., a body 110 described later), in which the working system includes a manpower working area (e.g., manpower working areas 130A, 130B described later) that is provided along a conveyance path (e.g., a conveyance path 121 described later) and in which the plurality of operators is deployed, a robot working area (e.g., a robot working area 140 described later) that is provided along the conveyance path and in which the plurality of robots is disposed, and a buffer space (e.g., buffer spaces 150A and 150B described later) provided between the manpower working area and the robot working area, the manpower working area being configured for continuous transfer of the work and the robot working area being configured for tact-transfer of the work, the method includes steps of: selecting an operation to be transferred among manpower operations; performing the operation to be transferred on a side closest to the buffer space in the manpower working area; installing a new robot (e.g., a robot R104 described later) in the buffer space to expand the robot working area; transferring the manpower operation to be transferred to an operation of the new robot; and reducing an area on the side closest to the buffer space in the manpower working area to curtail the manpower working area.

According to this invention, the step of transferring a manpower operation to a robot operation is as follows. First, select an operation to be transferred among the manpower operations. Next, perform this manpower operation to be transferred on the side closest to the buffer space in the manpower working area. Next, install the new robot in the buffer space to expand the robot working area. Next, transfer the manpower operation to be transferred to an operation of the new robot. Next, reduce the area closest to the buffer space in the manpower working area, thereby curtailing the manpower working area.

In this manner, when the new robot is installed, the robot and peripheral equipment of the robot can be installed in the buffer space. Since the equipment etc. and construction workers do not become a hindrance to the operators working in the manpower working area during the installation operation, it is possible to install the robot without interrupting the production line.

In addition, since the manpower operation to be transferred can be immediately transferred to an operation of the new robot after the new robot has been installed in the buffer space, it is possible to perform a smooth transition of the operation performed by manpower to an operation performed by the robot.

In addition, since not only the robot working area expands, but also the manpower working area contracts, the transition can be implemented without changing the length of the production line, which results in low cost. In other words, even though the robot working area expands and the operation performed by the robot increases by one process, the length of the production line is the same as before expanding the robot working area. Therefore, even if process automation is further scheduled later, it is possible to easily expand the robot working area so as to smoothly transfer a manpower operation to a robot operation by repeating the above sequence.

EFFECTS OF THE INVENTION

According to the present invention, even if a fault in a robot of the robot working area occurs and the conveyance of the works by tact-transfer is temporarily interrupted, the operators in the manpower working area can be prevented from having downtime, since the works being conveyed by continuous transfer during a time period until the conveyance of the works is restarted can be accommodated in the buffer space on the upstream side of the robot working area. In addition, after the conveyance of the works has restarted, it is possible to spill out a leading work among the works in the robot working area into the buffer space, and further, to convey this work spilled out at high speed, thereby causing this work to catch up with a work in front within the buffer space. Therefore, it is possible to reliably supply the works being continuously transferred to the manpower working area, preventing the operators in the manpower working area from having downtime.

In addition, according to the present invention, when the new robot is installed, the robot and peripheral equipment of the robot can be installed in the buffer space. Since the equipment etc. and construction workers do not become a hindrance to the operators working in the manpower working area during the installation operation, it is possible to install the robot without interrupting the production line. In addition, since the manpower operation to be transferred can be immediately transferred to an operation of the new robot after the new robot has been installed in the buffer space, it is possible to perform a smooth transition of the operation performed by manpower to an operation performed by the robot. In addition, since not only the robot working area expands, but also the manpower working area contracts, the transition can be implemented without changing the length of the production line, which results in low cost. In other words, even though the robot working area expands and the operation performed by the robot increases by one process, the length of the production line is the same as before expanding the robot working area. Therefore, even if process automation is further scheduled later, it is possible to easily expand the robot working area so as to smoothly transfer a manpower operation to a robot operation by repeating the above sequence.

EXPLANATION OF REFERENCE NUMERALS 1 work assembling system (working system)
10 body (work)
21 conveyance path
30A, 30B manpower working area
40 robot working area
50A first buffer space
50B second buffer space
P1-P5 operators
R1-R6 robots
101 work assembling system (working system)
110 body (work)
121 conveyance path
130A, 130B manpower working area
140 robot working area
150A, 150B buffer space
P101-P108 operators
R101-R104 robots

PREFERRED MODE FOR CARRYING OUT THE INVENTION

Each embodiment of the present invention will be explained hereinafter based on the drawings.

First Embodiment

Figure 1:
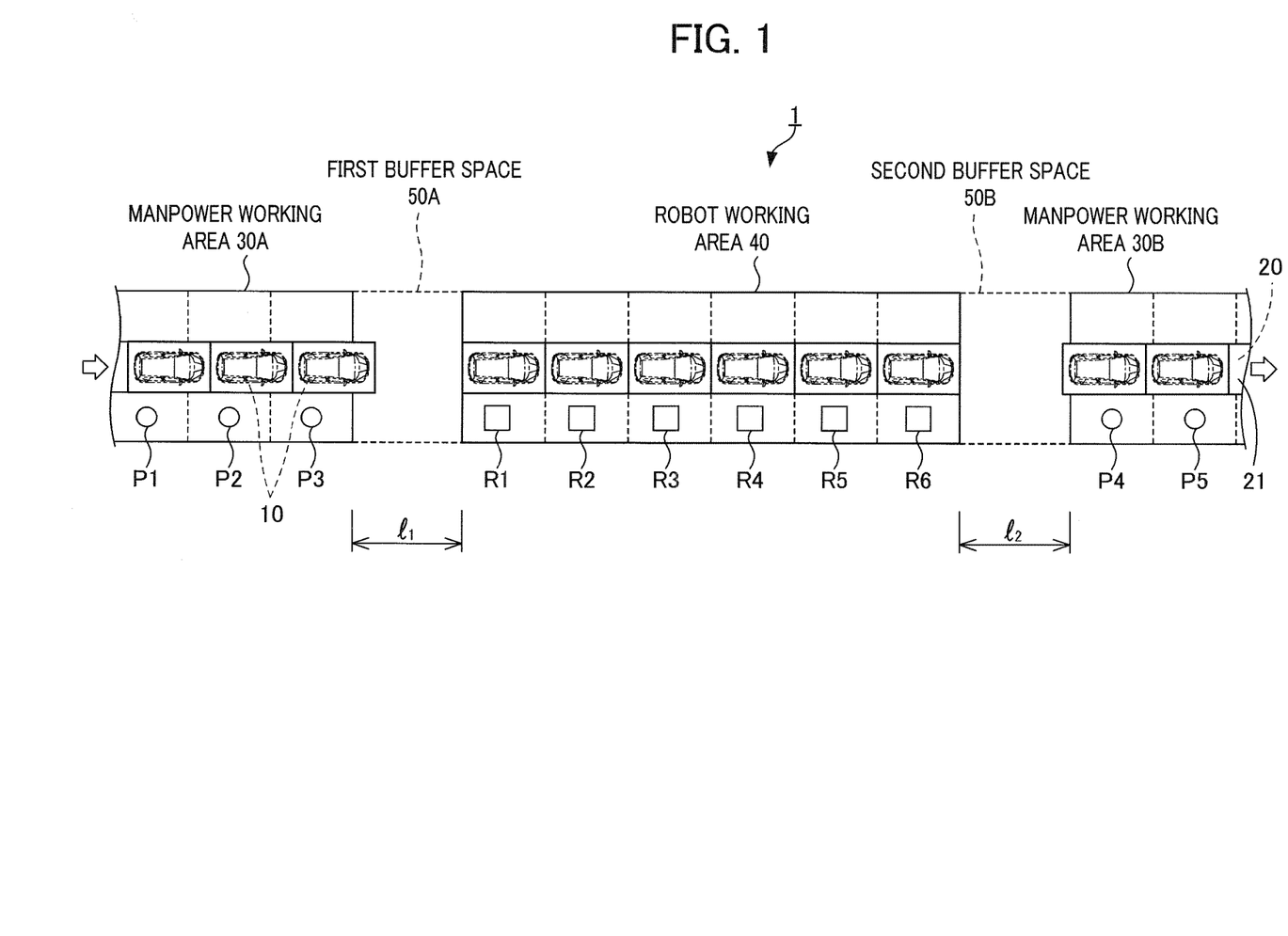
FIG. 1 is a block diagram showing a configuration of a working system according to a first embodiment of the present invention.

FIG. 1 is a plan view of a work assembling system 1 as a working system according to a first embodiment of the present invention.

The work assembling system 1 assembles a body 10 of an automobile as a work by way of manpower operations performed by operators and robot operations performed by robots.

This work assembling system 1 includes a conveyor device 20 that conveys bodies 10 of automobiles along a conveyance path 21, two manpower working areas 30A and 30B provided along the conveyance path 21, and a robot working area 40 provided along the conveyance path 21.

Robots R1 to R6 for assembling the body 10 are disposed in the robot working area 40 in order from an upstream side of the conveyance path 21.

The manpower working areas 30A and 30B are constituted by a manpower working area 30A provided on an upstream side of the robot working area 40, and a manpower working area 30B provided on a downstream side of the robot working area 40.

Operators P1 to P3 for assembling the body 10 are deployed in the manpower working area 30A in order from an upstream side of the conveyance path 21. On the other hand, operators P4 and P5 for assembling the body 10 are deployed in the manpower working area 30B in order from an upstream side of the conveyance path 21.

The conveyor device 20 conveys the bodies 10 in the manpower working areas 30A and 30B without interruption. In contrast, the conveyor device 20 intermittently conveys the bodies 10 in the robot working area 40. In other words, the conveyor device 20 continuously transfers the bodies 10 in the manpower working areas 30A and 30B, and tact-transfers the bodies 10 in the robot working area 40.

Herein, a first buffer space 50A is provided in a boundary portion between the manpower working area 30A and robot working area 40 in the conveyance path 21.

On the other hand, a second buffer space 50B is provided in a boundary portion between the robot working area 40 and the manpower working area 30B in the conveyance path 21.

The reason for providing these buffer spaces 50A and 50B is as follows.

The conveyance speed of the body 10 is constant in the manpower working areas 30A and 30B and the robot working area 40. However, as described above, the conveyance methods of the body 10 differ between the manpower working areas 30A and 30B and the robot working area 40. Accordingly, buffer spaces are provided in boundary portions between the manpower working areas 30A and 30B and the robot working area 40, and the length of a buffer space is determined as a length $l_T$ of one tact segment. While adjacent bodies 10 are in this buffer space, the interval between the adjacent bodies 10 as works changes between zero and a length $l_T$ of one tact segment. This indicates that this $l_T$ is a minimum required length of the buffer space.

Incidentally, in a case of a fault arising in any of the robots R1 to R6 of the robot working area 40, it is necessary to temporarily interrupt conveyance of the bodies 10 in the robot working area 40. When such an interruption occurs, continuous transfer is suspended in the manpower working area 30A. Accordingly, this poses a problem that the operators have downtime.

Figure 2:
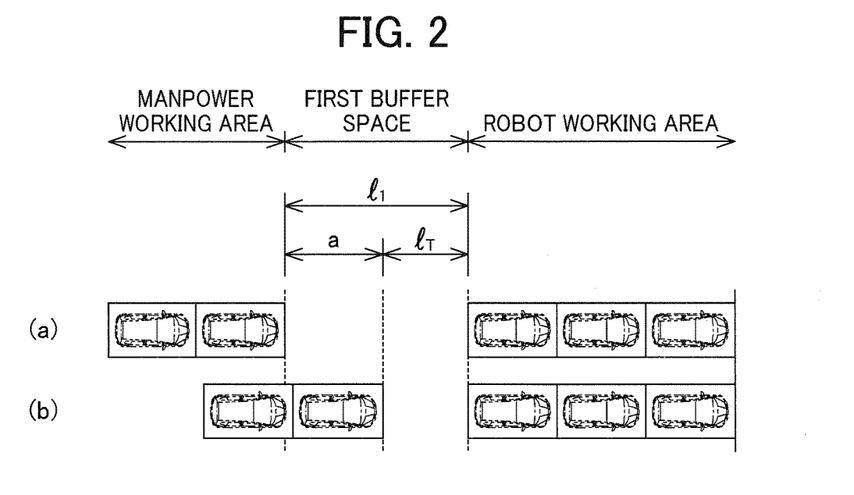
FIG. 2 is a diagram showing a time-dependent change in the position of works for a buffer space on a side upstream of a robot area of the working system according to the embodiment.

In FIG. 2, (a) shows a state immediately before the conveyance of the bodies 10 is interrupted. In FIG. 2, (b) shows a state immediately after the conveyance of the bodies 10 is restarted.

The bodies 10 are spilled out from the manpower working area 30A into the buffer space 50A in continuous transfer. As shown in (a) and (b) of FIG. 2, it may be that the length of the first buffer space 50A is set as the minimum required length $l_T$ of the buffer space plus at least a predetermined length a. This predetermined length a is an amount of movement of the body 10 spilling out in continuous transfer within the first buffer space 50A during a time period from the interruption to the restart of conveyance of the bodies 10.

Therefore, a length $l_1$ of the first buffer space is determined as in the following formula (1):

$$l_1 = l_T + a = l_T + t \cdot v \qquad (1)$$

In formula (1), $l_T$ is the length of one tact segment of tact-transfer, t is the time during which the conveyance of the bodies 10 by tact-transfer is interrupted for a case where a fault occurs in the robots R1 to R6, and v is the conveyance speed of the bodies 10.

Herein, the time t during which the conveyance is interrupted indicates a time until a small fault in a robot is repaired and the robot is recovered, or a time until it is determined that a fault in the robot is significant, the robot is completely stopped, and an operation performed by the robot is removed from the production line.

On the other hand, in a case of a fault in any of the robots R1 to R6 of the robot working area 40 arising, and the conveyance of the bodies 10 in the robot working area 40 being temporarily interrupted, since the conveyance of the bodies 10 continues in the manpower working area 30B, there is a problem in that the bodies 10 continuously transferred in the manpower working area 30B are not supplied, causing the operators to have downtime.

Figure 3:
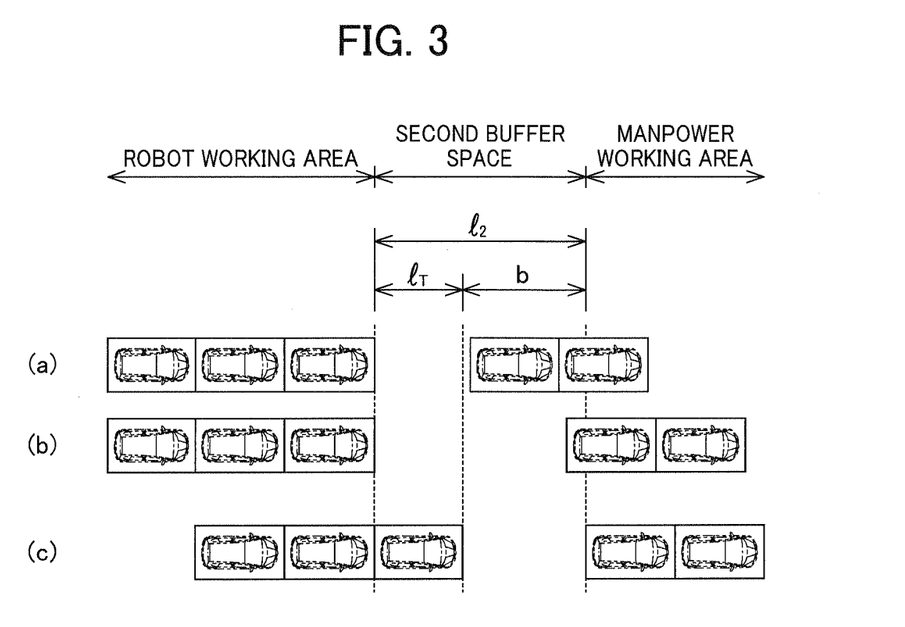
FIG. 3 is a diagram showing a time-dependent change in the position of works for a buffer space on a side downstream of the robot area of the working system according to the embodiment.

In FIG. 3, (a) shows a state immediately before the conveyance of the bodies 10 is interrupted. In FIG. 3, (b) shows a state immediately after the conveyance of the bodies 10 is restarted. In FIG. 3, (c) shows a state immediately after a leading body among the bodies 10 in the robot working area 40 is spilled out into the second buffer space 50B after the conveyance has been restarted.

Since it is necessary to supply the bodies 10 to the manpower working area 30B without interruption, it may be that the length of the second buffer space 50B is set as the minimum required buffer space $l_T$ plus at least a predetermined length b, as shown in (a)-(c) of FIG. 3. The predetermined length b is an amount of movement of the body 10 being conveyed by continuous transfer during a time period from the interruption and the restart of conveyance of the bodies 10 in the robot working area 40 until a leading body among the bodies 10 in the robot working area 40 is spilled out into the second buffer space 50B.

Therefore, the length $l_2$ of the second buffer space 50B is determined as in the following formula (2):

$$l_2 = l_T + b = l_T + (t + t_f) \cdot v \quad (2)$$

In formula (2), $l_T$ is the length of one tact segment of tact-transfer, and t is the time during which the conveyance of the bodies 10 by tact-transfer is interrupted for a case where a fault occurs in the robots R1 to R6. In addition, $t_f$ is a time until the body 10 for which the conveyance has been interrupted undergoes accelerated-transfer and is spilled out into the second buffer space 50B after the conveyance of the bodies 10 has restarted, and v is a conveyance speed of the body 10.

Hereinafter, specific examples of the first buffer space 50A and the second buffer space 50B will be explained.

For example, the conveyance speed of continuous transfer and tact-transfer of the conveyance device 20 is set to 6 m in 50 seconds, and the length of one tact in tact-transfer is set to 6 m. In addition, the stop time is set to 60 seconds.

Under such setting, the length $l_1$ of the first buffer space 50A results in the following formula (3):

$$l_1 = 6 \text{ m} + 60 \text{ sec} \cdot 6 \text{ m}/50 \text{ sec} = 13.2 \text{ m} \quad (3)$$

In addition, if the accelerated-transfer time is set to 8 seconds, the length $l_2$ of the second buffer space 50B results in the following formula (4):

$$l_2 = 6 \text{ m} + (60 \text{ sec} + 8 \text{ sec}) \cdot 6 \text{ m}/50 \text{ sec} = 14.16 \text{ m} \quad (4)$$

According to the present embodiment, there are the following effects.

(1) Since the length $l_1$ of the first buffer space 50A is set as in the aforementioned formula (1), even if a fault in any of the robots R1 to R6 occurs and the conveyance of the bodies 10 by tact-transfer is temporarily interrupted, the operators in the manpower working area 30A on the upstream side of the robot working area 40 can be prevented from having downtime. The reason for this is that since the bodies 10 being conveyed by continuous transfer during a time period from the interruption to the restart of conveyance of the bodies 10 can be accommodated in this first buffer space 50A.

(2) Since the length $l_2$ of the second buffer space 50B is set as in the aforementioned formula (2), even if a fault in any of the robots R1 to R6 occurs and the conveyance of the bodies 10 by tact-transfer is temporarily interrupted, it is possible to spill out a leading body among the bodies 10 in this robot working area 40 into the second buffer space 50B, and further, to convey the body 10 spilled out at high speed so as to catch up with a body 10 in front being continuously transferred within this second buffer space 50B after conveyance of the bodies 10 has restarted. In this manner, the bodies 10 being continuously transferred can be supplied to the manpower working area without interruption, and the operators in the manpower working area 30B can be prevented from having downtime.

Second Embodiment

Figure 4:
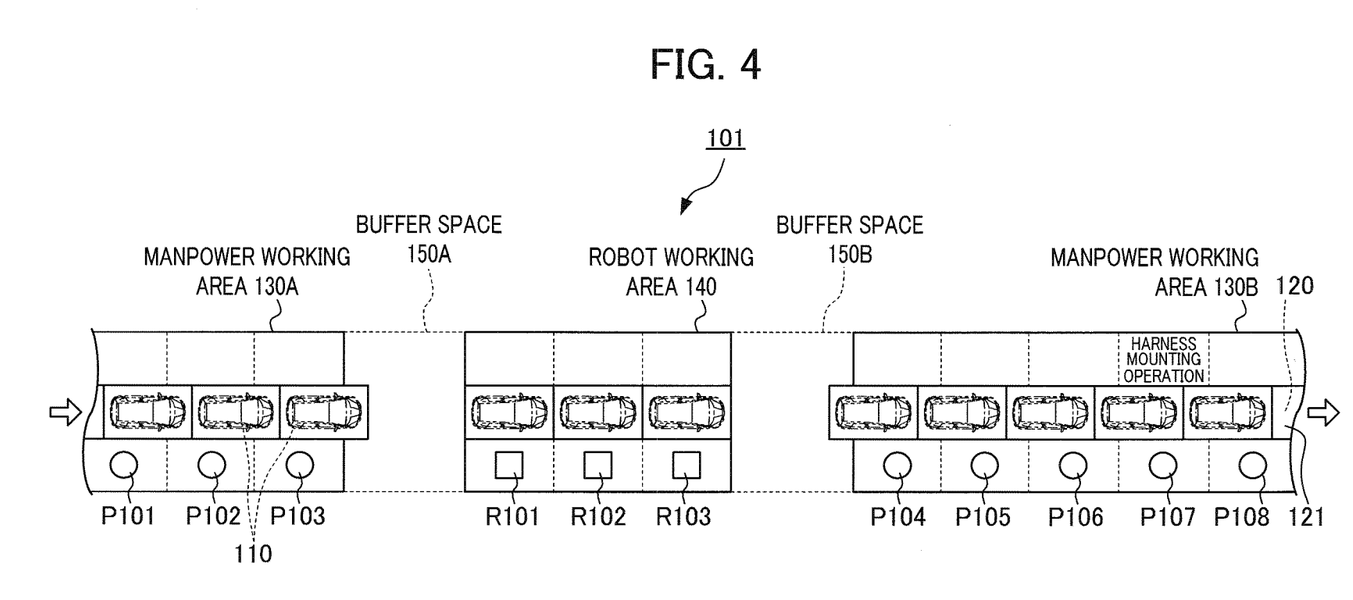
FIG. 4 is a block diagram showing a configuration of a working system to which a work-automating method according to a second embodiment of the present invention is applied.

FIG. 4 is a plan view of a work assembling system 10 as a working system to which a work-automating method is applied according to an embodiment of the present invention.

A work assembling system 101 assembles bodies 110 of automobiles as a work, by way of manpower operations performed by operators and robot operations performed by robots.

The work assembling system 101 includes a conveyance device 120 that conveys the bodies 110 of automobiles along a conveyance path 121, two manpower working areas 130A and 130B provided along the conveyance path 121, and a robot working area 140 provided along the conveyance path 121.

Robots R101 to R103 for assembling the body 110 are disposed in the robot working area 140 in order from an upstream side of the conveyance path 121.

The manpower working areas 130A and 130B are constituted by a manpower working area 130A provided on an upstream side of the robot working area 140, and a manpower working area 130B provided on a downstream side of the robot working area 140.

Operators P101 to P103 for assembling the body 110 are deployed in the manpower working area 130A in order from an upstream side of the conveyance path 121. On the other hand, operators P104 to P108 for assembling the body 110 are deployed in the manpower working area 130B in order from an upstream side of the conveyance path 121.

Buffer spaces 150A and 150B are provided at a boundary between the manpower working areas 130A and 130B and the robot working area 140.

The buffer spaces 150A and 150B are constituted by a buffer space 150A provided on an upstream side of the robot working area 140, and a buffer space 150B provided on a downstream side of the robot working area 140.

The conveyance device 120 conveys the bodies 110 in the manpower working areas 130A and 130B without interruption. In contrast, the conveyor device 120 intermittently conveys the bodies 110 in the robot working area 140. In other words, the conveyor device 120 continuously transfers the bodies 110 in the manpower working areas 130A and 130B, and tact-transfers the bodies 110 in the robot working area 140.

With the aforementioned work assembling system 101, the processes performed by manpower operations are automated in the following sequence.

First, as shown in FIG. 4, select an operation to be transferred among manpower operations. For example, select a harness mounting operation as the operation to be transferred. This harness mounting operation is being performed by the operator P107 in the manpower working area 130B.

Figure 5:
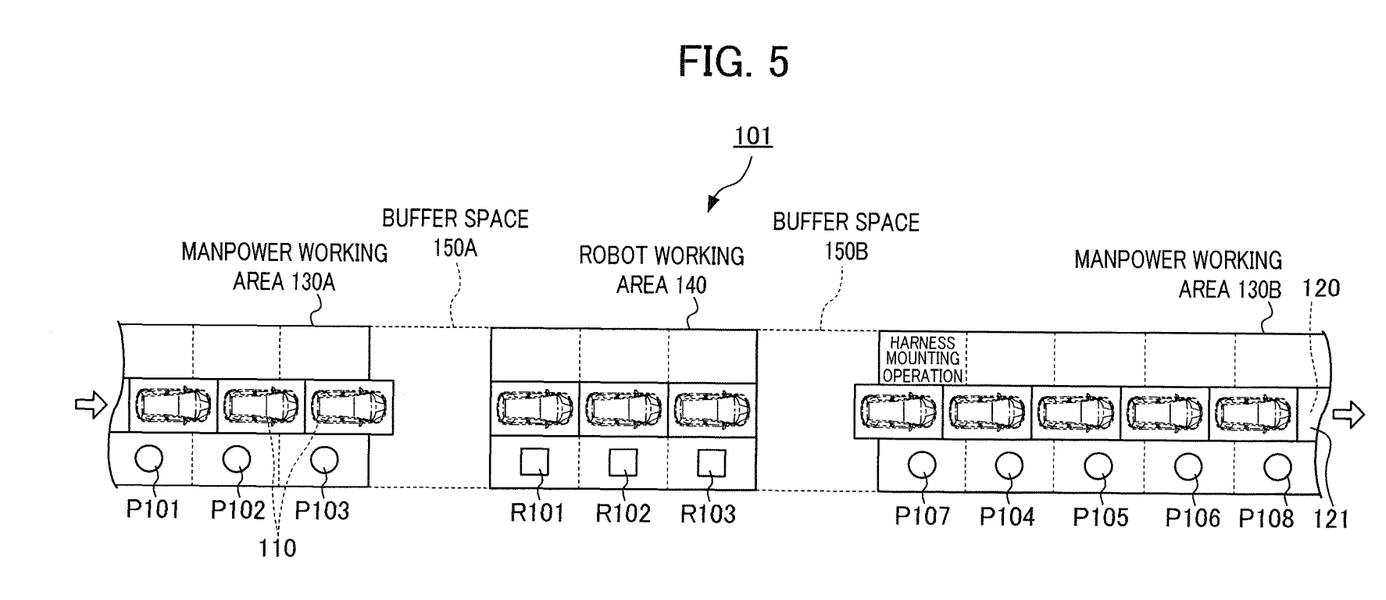
FIG. 5 is a diagram for illustrating a sequence of selecting manpower operations to be transferred for the working system according to the embodiment.

Next, as shown in FIG. 5, perform this manpower operation to be transferred on a side closest to the buffer space 150B in the manpower working area 130B. More specifically, the operator P107 performing this harness mounting operation moves to the side closest to the buffer space 150B among the operators P104 to P108 in the manpower working area 130B. In addition, the operators P104 to P106 that have been deployed on an upstream side of the operator P107 shift to a downstream side by one work space.

Figure 6:
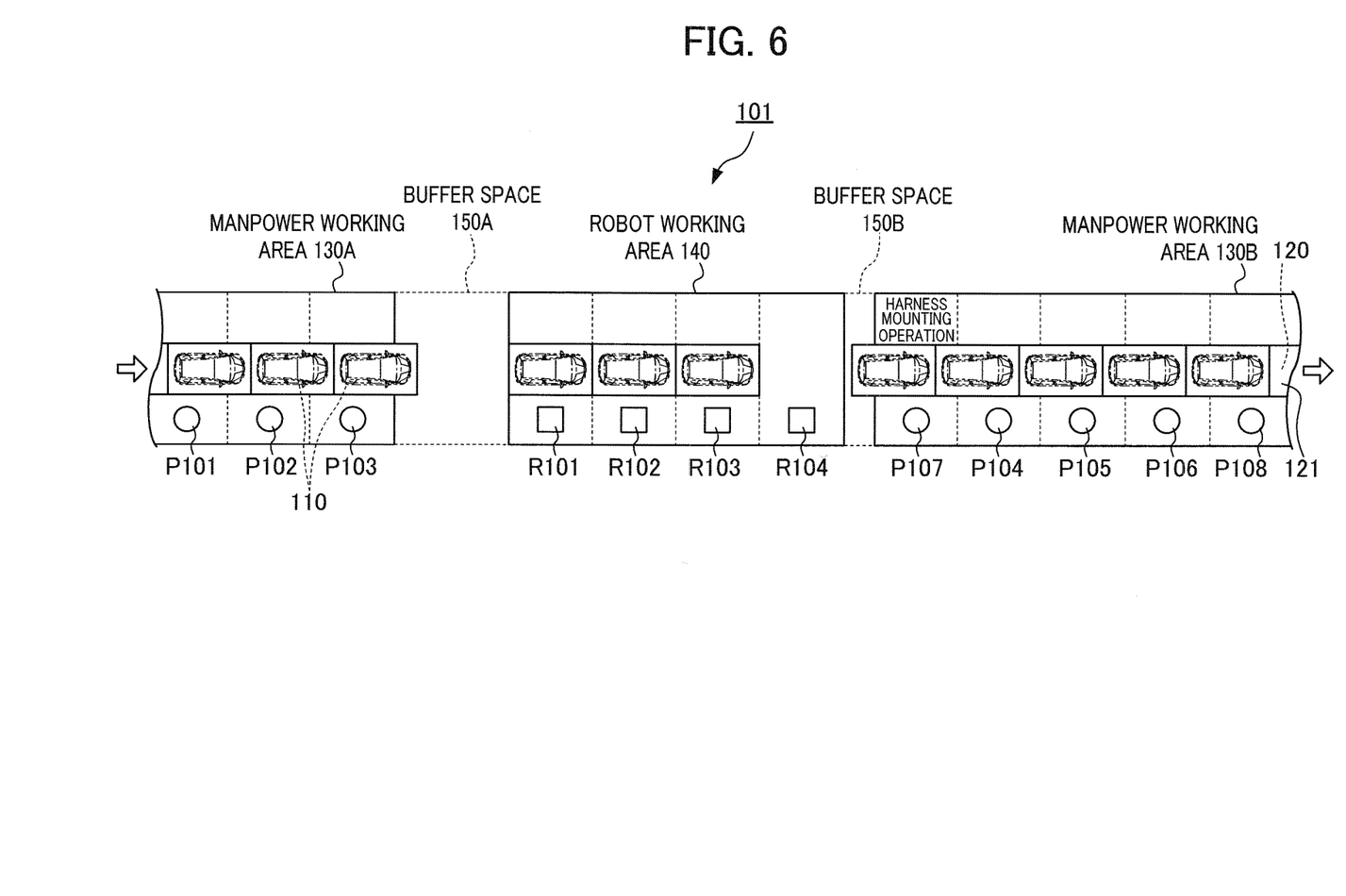
FIG. 6 is a diagram for illustrating a sequence of installing a new robot and expanding a robot working area for the working system according to the embodiment.

Next, as shown in FIG. 6, install a new robot R104 in the buffer space 150B to expand the robot working area 140 towards a downstream side. More specifically, install the new robot R104 on a downstream side of the robot R103. Since this buffer space 150B is a vacant space, the robot R104 can be installed easily even while the conveyance device 120 is operating.

Figure 7:
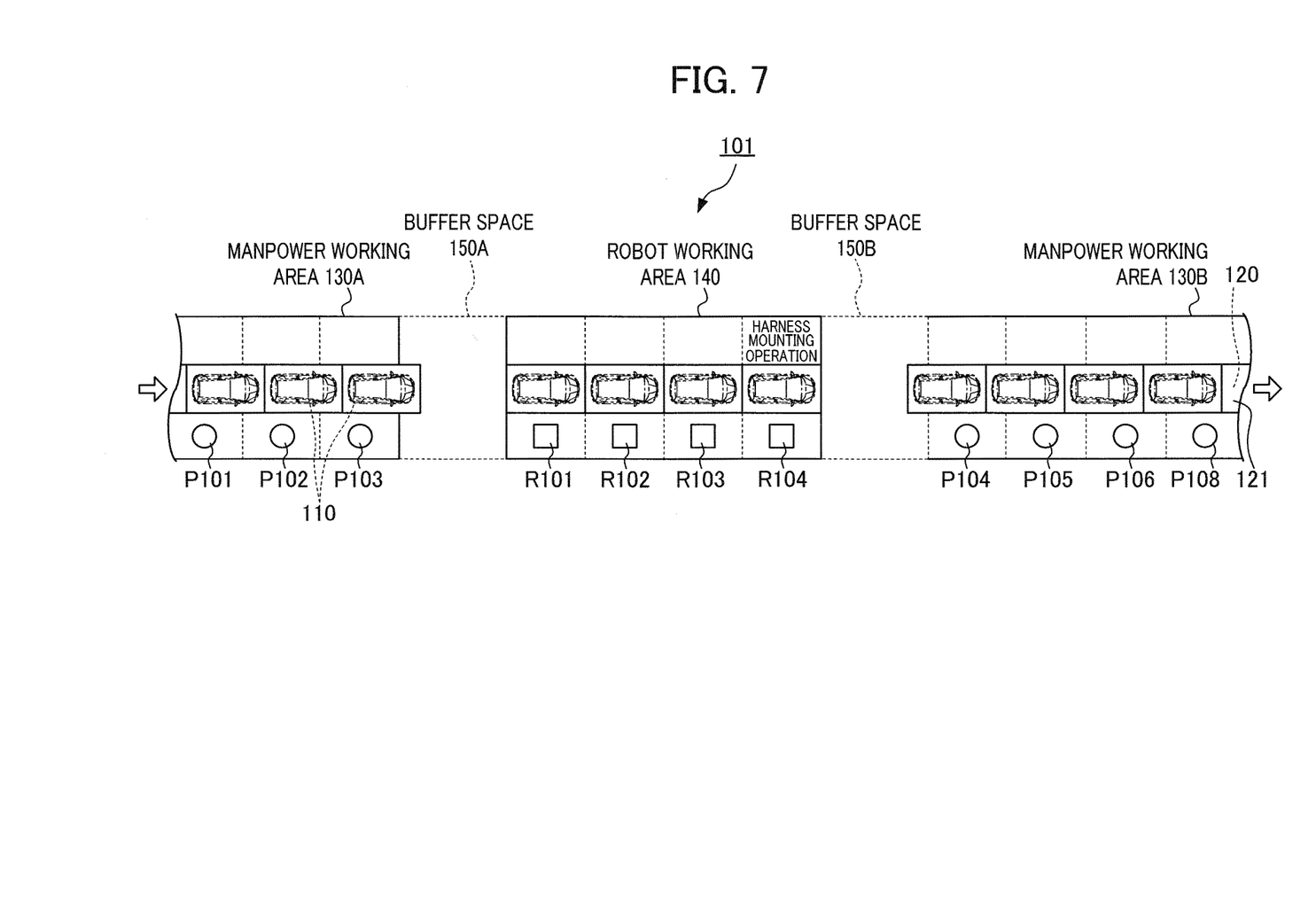
FIG. 7 is a diagram for illustrating a sequence of transferring a manpower operation to be transferred to an operation of the new robot for the working system according to the embodiment.

Next, as shown in FIG. 7, transfer the manpower operation to be transferred to an operation of the new robot R104. More specifically, the harness mounting operation is performed by the robot R104. Thereafter, the operator P107 moves to another working position that is not illustrated. In this manner, since the manpower working area 130B contracts toward the downstream side, the length of the buffer space 150B does not change.

According to the present embodiment, there are the following effects.

(3) When a new robot R104 is installed in the buffer space 150B, the robot R104 and peripheral equipment of the robot R104 can be installed in the buffer space 150B. Since the equipment etc. and construction workers do not become a hindrance to operators working in the manpower working area 130B during the installation operation, it is possible to install the new robot R104 without interrupting the production line.

In addition, since the manpower operation to be transferred can be immediately transferred to an operation of the new robot R104 after the new robot R104 has been installed in the buffer space 150B, it is possible to perform a smooth transition of the harness mounting operation performed by manpower to a harness mounting operation performed by the robot.

In addition, since not only the robot working area 140 is expanded, but also the manpower working area 130B is contracted, the transition can be implemented without changing the length of the production line, which results in low cost. In other words, even though the robot working area 140 expands and the operation performed by the robot R104 increases by one process, the length of the production line is the same as before expanding the robot working area 140. Therefore, even if process automation is further scheduled later, it is possible to easily expand the robot working area 140 so as to smoothly transfer a manpower operation to a robot operation by repeating the above sequence.

It should be noted that the present invention is not limited to the embodiments, and modifications, improvements, and the like within a scope that can achieve the object of the present invention are included in the present invention.

For example, although a process being performed in the manpower working area 130B is automated and the robot working area 140 is expanded towards a downstream side in the aforementioned second embodiment, it is not limited thereto. Alternatively, a process being performed in the manpower working area 130A may be automated and the robot working area 140 expanded towards an upstream side.

The invention claimed is:

1. A working system; comprising:
   a manpower working area that is provided along a conveyance path and in which a plurality of operators are deployed;
   a robot working area that is provided along the conveyance path on an upstream side of the manpower working area and in which a plurality of robots are disposed; and
   a buffer space provided at a boundary portion between the robot working area and the manpower working area,
   the manpower working area being configured for continuous transfer of a work, and the robot working area being configured for tact-transfer of the work,
   wherein a length $l_2$ of the buffer space is determined by the following formula:

$$l_2 = l_T + (t + t_f) \cdot v,$$

where $l_T$ is a length of one tact segment in tact-transfer, t is a time during which the conveyance of the work by way of tact-transfer is interrupted for a case where a fault occurs in a robot, $t_f$ is a time after the conveyance of the work is restarted until the work for which the conveyance has been interrupted undergoes accelerated-transfer to be spilled out into the buffer space, and v is a conveyance speed of the work.

2. A work-automating method of transferring a manpower operation to a robot operation for a working system that employs a plurality of operators and a plurality of robots to perform operations on a work,
   wherein the working system comprises a manpower working area that is provided along a conveyance path and in which the plurality of operators are deployed, a robot working area that is provided along the conveyance path and in which the plurality of robots are disposed, and a buffer space provided between the manpower working area and the robot working area, the manpower working area being configured for continuous transfer of the work and the robot working area being configured for tact-transfer of the work, the method comprising:
   selecting an operation to be transferred among manpower operations;
   performing the operation to be transferred on a side closest to the buffer space in the manpower working area;
   installing a new robot in the buffer space to expand the robot working area;
   transferring the manpower operation to be transferred to an operation of the new robot; and
   reducing an area on the side closest to the buffer space in the manpower working area to curtail the manpower working area.

* * * * *